US012749909B2

(12) United States Patent
Bilanski et al.

(10) Patent No.: US 12,749,909 B2
(45) Date of Patent: Sep. 29, 2026

(54) METHOD FOR TRANSMISSION OF ELECTRIC ENERGY, SUPPLY FACILITY, HOUSEHOLD APPLIANCE AND SYSTEM

(71) Applicant: BSH Hausgeräte GmbH, Munich (DE)

(72) Inventors: Artur Bilanski, Rzeszow (PL); Michael Hohmann, Bad Neustadt a.d. Saale (DE); Markus Kühnel, Radeberg (DE)

(73) Assignee: BSH Hansgeräte GmbH, Munich (DE)

( * ) Notice: Subject to any disclaimer, the term of this patent is extended or adjusted under 35 U.S.C. 154(b) by 907 days.

(21) Appl. No.: 18/013,281

(22) PCT Filed: Jul. 20, 2021

(86) PCT No.: PCT/EP2021/070247
§ 371 (c)(1),
(2) Date: Jun. 7, 2023

(87) PCT Pub. No.: WO2022/028875
PCT Pub. Date: Feb. 10, 2022

(65) Prior Publication Data
US 2024/0047984 A1 Feb. 8, 2024

(30) Foreign Application Priority Data
Aug. 5, 2020 (DE) ..................... 10 2020 209 846.8

(51) Int. Cl.
*H02J 7/00* (2006.01)
*B60L 3/00* (2019.01)
(Continued)

(52) U.S. Cl.
CPC ............ *H02J 7/855* (2026.01); *B60L 3/0023* (2013.01); *B60L 53/65* (2019.02); *H02J 7/47* (2026.01);
(Continued)

(58) Field of Classification Search
CPC ... H02J 7/855; H02J 7/927; H02J 7/47; B60L 53/65
(Continued)

(56) References Cited

U.S. PATENT DOCUMENTS

2004/0037221 A1 2/2004 Aisa
2005/0156562 A1* 7/2005 Cohen .................. A47L 9/2873 320/107
(Continued)

FOREIGN PATENT DOCUMENTS

DE 102013001194 A1 7/2014

OTHER PUBLICATIONS

Len Sherman, "The Basics of USB Battery Charging: a Survival Guide", Dec. 9, 2010 (Dec. 9, 2010), Retrieved from: URL:http://www.maximintegrated.com/app-notes/index.mvp/id/4803, XP055047785, (found on Dec. 13, 2012), p. 2, Paragraphs 1-5.

*Primary Examiner* — Nathaniel R Pelton
(74) *Attorney, Agent, or Firm* — Laurence A. Greenberg; Werner H. Stemer; Ralph E. Locher

(57) ABSTRACT

A method for transmitting electrical energy from a supply facility to a domestic appliance via an electrical connection, includes delimiting electrical energy provided via the connection to a first predetermined amount, operating at least one electrical consumer of the domestic appliance with energy from the connection according to a predetermined sequence, determining a temporal progression of energy transmitted via the connection during the sequence, and terminating the delimitation to the first amount if the specific temporal progression corresponds to a predetermined temporal progression. A supply facility for a household appliance and a household appliance for connection to a supply facility, are also provided.

14 Claims, 3 Drawing Sheets

(51) Int. Cl.
*B60L 53/65* (2019.01)
*H02J 7/47* (2026.01)
*H02J 7/90* (2026.01)
*H02J 105/42* (2026.01)

(52) U.S. Cl.
CPC ........... *H02J 7/927* (2026.01); *B60L 2200/40* (2013.01); *B60L 2240/80* (2013.01); *B60L 2260/32* (2013.01); *H02J 2105/42* (2026.01)

(58) Field of Classification Search
USPC .......................................................... 320/135
See application file for complete search history.

(56) References Cited

U.S. PATENT DOCUMENTS

2016/0064959 A1* 3/2016 Jung ......................... G06F 1/26
2021/0218070 A1* 7/2021 Yoon .................. H01M 10/425

* cited by examiner

METHOD FOR TRANSMISSION OF ELECTRIC ENERGY, SUPPLY FACILITY, HOUSEHOLD APPLIANCE AND SYSTEM

FIELD AND BACKGROUND OF THE INVENTION

The invention relates to the transmission of electrical energy. In particular, the invention relates to the safe transmission of electrical energy between a supply facility and a household appliance.

The household appliance is configured so as to receive electrical energy from a supply facility. By way of example, the household appliance can have a dedicated electrical energy storage device that can be charged by electrical energy from the supply facility. However, the household appliance is not permanently connected to the supply facility. After the connection has been produced, it should therefore be checked whether the supply facility and the household appliance are compatible with one another prior to a greater electrical energy being exchanged between both components. It is thus possible to prevent the supply facility applying an excessively high electrical energy to another consumer or to prevent electrical energy being mistakenly supplied instead to the household appliance at a parasitic resistance that can be formed by way of example by moisture, an object or a person coming into contact with the electrical connection.

It has been proposed to provide a communication between the household appliance and the supply facility via contacts of the electrical energy connection. It is only possible to transmit a greater electrical energy once this communication has been successfully realized. However, the transmission and evaluation of information via contacts of an energy supply can be complex. Another proposal relates to the evaluation of an electrical parameter of the household appliance at the energy connection of the supply facility. Such a parameter can relate by way of example to an impedance or an electrical resistance. However, the identification of the household appliance by the supply facility can in this case not meet higher demands. A further proposal also relates to the transmission of control information via a separate communication line, by way of example via WLAN or USB. However, an additional outlay with regard to driving hardware for this purpose can be considerable.

SUMMARY OF THE INVENTION

An object underlying the present invention is to propose an improved technology for safely transmitting electrical energy from a supply facility to a household appliance. The invention achieves this object by means of the subject matters of the independent claims. Subordinate claims disclose preferred embodiments.

According to a first aspect of the present invention, a method for transmitting electrical energy from a supply facility to a household appliance via an electrical connection includes steps of delimiting electrical energy that is provided via the connection to a first predetermined amount; operating at least one electrical consumer of the household appliance according to a predetermined sequence with energy from the connection; determining a temporal progression of energy that is transmitted via the connection during the sequence; and terminating the delimitation to the first amount if the specific temporal progression corresponds to a predetermined temporal progression.

In accordance with the invention, the household appliance can be identified by the supply facility with the aid of the electrical characteristics of the consumer. The sequence can include switching on or switching off the consumer with the result that the swing-in and swing-out behavior of the consumer can be electrically evaluated. As a result, it is possible to check an electrical signature which can be characteristic for the consumer and consequently can also be characteristic for the household appliance. In order to identify the household appliance, neither additional information needs to be transmitted via the electrical connection nor must a separate channel be provided for communication. A selectivity of the determination can still be high.

The sequence can be adapted in a flexible manner to one or more consumers that are included by the household appliance. In the event that there is only one consumer, this can be operated according to a predetermined temporal pattern by way of example with switch-on periods that become longer.

The electrical energy that is provided via the connection can be delimited in particular to a predetermined electrical current and/or to a predetermined electrical voltage. In order to delimit the current that is flowing via the connection, the electrical voltage that is provided by the supply facility can be controlled.

It is preferred that the electrical energy that is provided delimited to the first amount has a voltage which does not exceed a predetermined first threshold value that is preferably selected such that a person or a pet are not placed in danger, by way of example approx. 5-18 V. It is preferred that the current that is flowing via the connection does not exceed a second threshold value that is further preferably selected such that the person or the pet are not placed in danger, by way of example approx. 10-50 mA. In a further embodiment, it is possible to delimit electrical power that is transmitted via the connection as a product of current and voltage, by way of example to approx. 1-5 W. This power can prevent a fire breaking out in the case of a short circuit at the connection.

It is likewise possible to realize a mixed form in which the voltage, the current and/or the power are delimited. In the case of the energy that is provided, it can be DC voltage even when said mixed form can comprise a variable component. In a further embodiment, the energy that is limited to the first amount is periodically provided only for a specific duration. As a result, a duration of influence on a different consumer, which is connected to the supply facility, other than the household appliance can be reduced, with the result that risk of injury can be further reduced. By way of example, the energy can only be provided in each case over a duration of some seconds long, followed by a pause of multiple seconds or minutes.

In a further embodiment, multiple electrical consumers of the household appliance are operated according to a predetermined sequence. In this case, the consumers are operated by way of example temporally one after the other or in part overlapping in order to determine an electrical signature having a high information content. One of the electrical consumers can possibly comprise a motor that drives by way of example a pump, a fan or a gear. Another exemplary consumer can possibly include a heater, an illuminating facility or an acoustic output.

It is preferred that the delimitation includes that a current strength of the electrical energy that is provided via the connection is delimited to a predetermined value. For this purpose, an electrical voltage at the connection can preferably be held to a predetermined nominal voltage. If an electrical resistance of an element that is connected to the supply facility reduces, then an electrical current of the electrical energy that is transmitted via the connection increases up to the predetermined value. In order to prevent this value being exceeded, the voltage of the electrical energy that is provided can be accordingly reduced. The electrical energy that is transmitted via the connection can be determined with the aid of the current strength, whereas the voltage corresponds to the nominal voltage, or with the aid of the voltage drop below the nominal voltage, whereas the current strength corresponds to the predetermined value. In a further embodiment, the transmitted electrical energy can be determined with the aid of the electrical current and electrical voltage at the connection.

An energy absorption of the electric consumer can increase in a time-delayed manner after the switch-on or it can drop back down from a higher value. In particular when the electric consumer is configured so as to move a mechanical mass, the movement can follow a flow of electrical energy. The temporal delay can reflect aspects of the mechanical and electrical construction of the electric consumer, with the result that the consumer can be recognized with improved separation precision. In a similar embodiment, the consumer can be configured so as to warm up a thermal mass, wherein the warming can follow a flow of energy likewise in a time-delayed manner.

The sequence can include the consumer only being switched on during a predetermined duration. The duration can be selected so short that a full electrical power that can be converted by the consumer is not realized. The effect produced by the electric consumer, by way of example a movement or warming, can be so small as a result of the short duration that it cannot be disturbing for a person in the area of the household appliance. In particular, a performed movement or an effected warming can be so small that the person hardly notices them or does not notice them at all.

A type of household appliance can be recognized on the basis of the temporal progression. The energy that is provided via the connection can be adapted to the specific type after the termination of the first delimitation. The adaptation can relate in particular to a maximum electrical current or a provided electrical voltage of the energy at the connection. Thus, different household appliances can each be operated in an optimum manner on only one supply facility.

In a further embodiment, the adaptation includes that the energy that is provided via the connection is delimited to a second predetermined amount. As a result, it is possible to ensure that the household appliance or the supply facility is not overloaded electrically.

In a further embodiment, the household appliance is configured so as itself to move with respect to the supply facility. The household appliance can be moved to the supply facility in order to produce the connection. For this purpose, the household appliance can take energy from a different source other than the connection to the supply facility. By way of example, the household appliance can include an autonomous robot that is configured so as to navigate in a household independently. The household appliance can include possibly a floor treating machine, by way of example a floor vacuum cleaner or a floor wiping appliance. In another embodiment, the household appliance can include an autonomous lawnmower or a different appliance that can move independently in the household. The supply facility for a household appliance of this type is usually described as a docking station. In this case, the supply facility can support further functions, by way of example emptying a dirt container or cleaning a filter or cleaning a broom.

It is particularly preferred that the household appliance includes an electrical energy storage device that, after the delimitation to the first amount is terminated, is charged by means of energy that is transmitted via the connection. It is possible by means of the method in accordance with the invention to prevent that greater electrical energy is transmitted from the supply facility to a different consumer other than the household appliance. The electrical energy storage device can be charged with a high charging current with the result that an efficient and rapid charging is possible. The safety of a person in the area of the household appliance or of the supply facility cannot be compromised thereby.

According to a second aspect of the present invention, a supply facility for a household appliance comprises a terminal for producing an electrical connection to the household appliance; a controllable power source for providing electrical energy via the connection; and a processing facility. In this case, the processing facility is configured so as to delimit the energy that is provided via the connection to a first predetermined amount; to determine a temporal progression of energy that is transmitted via the connection; and to terminate the delimitation to the first amount if the specific temporal progression corresponds to a predetermined temporal progression.

The supply facility can be fixedly allocated to a predetermined household appliance or a predetermined type of household appliances. In another embodiment, different household appliances can be supplied with electrical energy by means of the supply facility.

The processing facility can be configured so as to perform in full or in part a method that is described herein. For this purpose, the processing facility can include a programmable microcomputer or microcontroller and the method can be in the form of a computer program product having program code means. The computer program produce can also be stored on a computer-readable data carrier. Features or advantages of the method can be transmitted to the supply facility or a household appliance described herein or vice versa.

According to a further aspect of the present invention, a household appliance for connection to a supply facility comprises a terminal for producing an electrical connection to the supply facility; an electrical energy storage device; a controllable electrical consumer that can be operated with energy from the connection; and a processing facility. In this case, the processing facility can be configured so as to operate the consumer according to the predetermined sequence with energy from the connection, with the result that energy that is transmitted via the connection follows a temporal progression; and to charge the energy storage device by means of energy from the connection.

The processing facility can be configured so as to perform in full or in part a method described herein.

The household appliance can include any appliance that can be used in a household and preferably includes an electrical energy storage device, by way of example a cableless mixer or a cordless screwdriver. In a further embodiment, the household appliance includes an autonomously drivable floor treating machine. This can include in particular a sweeper, a mopping machine, a vacuum cleaner or a lawnmower.

According again to a further aspect of the present invention, a system comprises a supply facility that is described herein and a household appliance that is described herein.

The invention is now described in detail with reference to the attached figures.

DETAILED DESCRIPTION OF THE INVENTION

Figure 1:
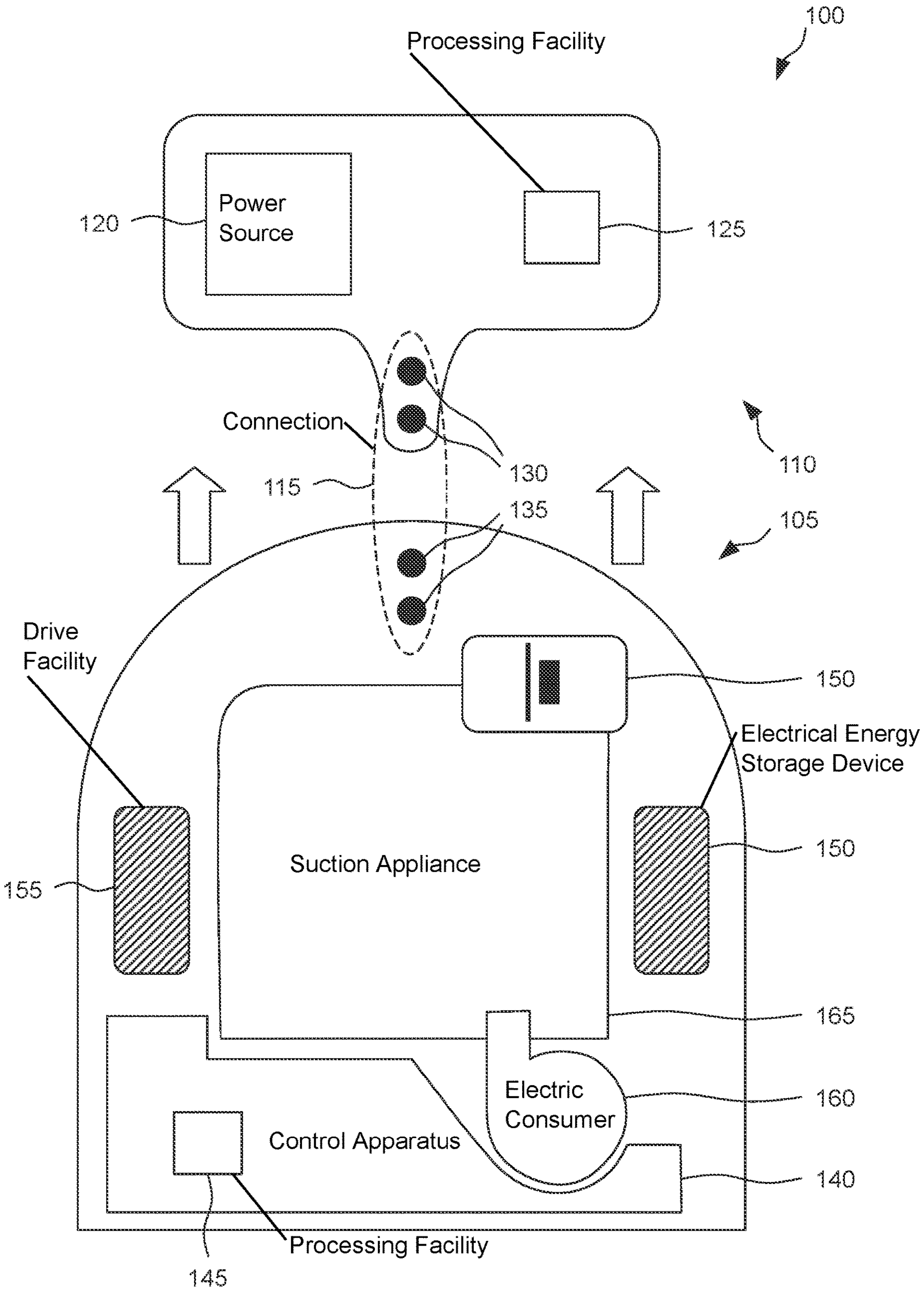
FIG. 1 shows a system having a household appliance and a supply facility.

FIG. 1 shows a system 100 having a household appliance 105 and a supply facility 110. The household appliance 105 is shown by way of example as a floor treating machine. The supply facility 110 is configured so as to provide electrical energy to the household appliance 105 when said household appliance is connected by means of a connection 115 to the supply facility 110. The supply facility 110 is usually fixed in place and can be connected to an energy supply network, in particular to a power supply network. Said supply facility comprises a power source 120 and a processing facility 125 that is configured so as to determine at least one aspect of electrical energy that is transmitted via the connection 115 and to activate the power source 120 so as to control at least one aspect of the transmitted electrical energy. Possible aspects of the transmitted energy include in particular a current strength or a voltage.

The supply facility 110 includes two first terminals 130 that, in order to produce the connection 115, can be brought into conductive contact in pairs with second terminals 135 that are included by the household appliance 105. In other embodiments, it is also possible to provide more than two first or second terminals 130, 135.

The household appliance 105 includes a control apparatus 140 having a processing facility 145, an electrical energy storage device 150, a drive facility 155, and an electric consumer 160 that is shown as a fan motor of a suction appliance 165. The suction appliance 165 is configured so as to clean a floor surface, whereas the household appliance 105 is controlled across the floor surface by means of the drive facility 155. The processing facility 145 is preferably configured so as to control a movement and a function of the household appliance 105. In addition, the processing facility 145 is preferably configured so as to electrically identify the household appliance 105 with respect to the supply facility 110, as is described herein in more detail. Furthermore, the processing facility 145 can control a charging of the electrical energy storage device 150 with electrical energy from the connection 115.

Figure 2:
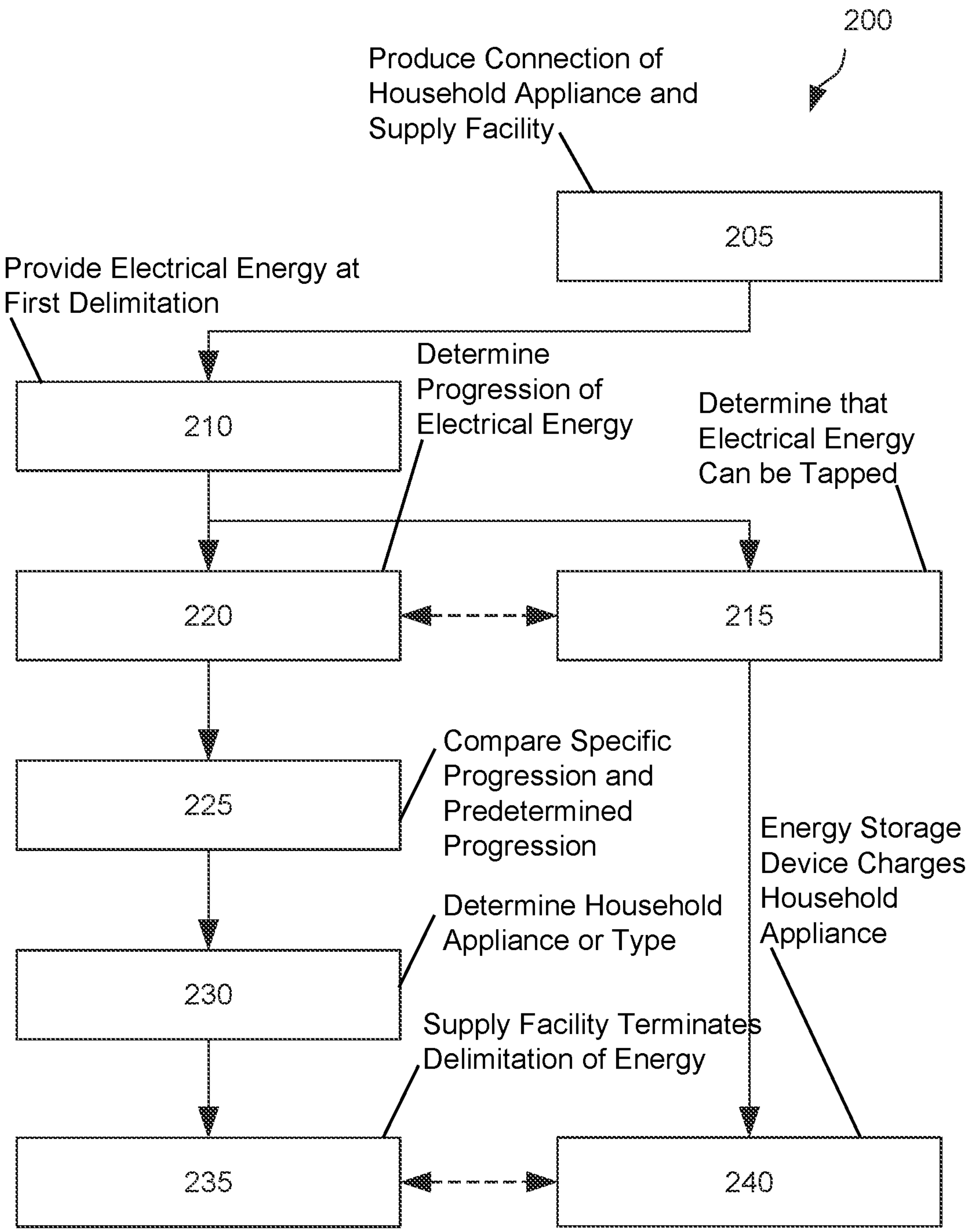
FIG. 2 shows a flow diagram of a method for transmitting energy.

FIG. 2 shows a flow diagram of a method 200 for transmitting energy from the supply facility 110 to the household appliance 105. The method 200 can be performed in sections. In the present representation, steps that are preferably performed by the supply facility 110 are shown in a left-hand region, and steps that are preferably performed by the household appliance 105 are shown in a right-hand region.

In a step 205, the connection 115 can be produced. For this purpose, the household appliance 105 can be activated so as to move in such a manner towards the fixed supply facility 110 until the terminals 130, 135 are in electrical contact in pairs.

In a step 210, the supply facility 110 can provide via the connection 115 electrical energy at a first delimitation. In this case, a voltage, a current and/or a power of the electrical energy that is provided via the connection 115 can be delimited. The provision of energy can commence as early as prior to or only after the production of the connection 115 in step 205. The first delimitation is preferably selected in such a manner that a transmittable energy does not pose a danger by way of example for a person, a pet, a foreign body or another object that is physically moving past the first terminal 130. By way of example, an electrical voltage can be delimited to approx. 5V and/or an electrical current can be delimited to approx. 10 mA.

In a step 215, the household appliance 105 can determine that electrical energy can be tapped via the connection 115, by way of example with the aid of a voltage that is prevailing at terminals 135. The household appliance 105 can then operate the consumer 160 according to a predetermined sequence with energy from the connection 115. The sequence can include in particular a predetermined temporal sequence of switching on and off processes. If multiple electric consumers 160 that can be controlled independently of one another are provided, then these can be operated in the sequence separately from one another or temporally overlapping with energy from the connection 115.

Simultaneously with the step 215, it is possible in a step 220 on the part of the supply facility 110 for a progression of the electrical energy that is received by the household appliance 105 or is transmitted via the connection 115 to be determined. In particular, it is possible to determine a current and/or a voltage of the transmitted energy.

In a step 225, it is possible to compare the specific progression with a predetermined progression. In the event that different household appliances 105 or types of household appliances 105 can be recognized, then accordingly numerous comparisons can take place. The steps 215 to 225 can be performed multiple times, wherein the result of a run can influence a following run. In the event that by way of example it is determined in a first run that in the case of a first sequence a first consumer 160 absorbs less than a predetermined quantity of energy, then it is possible in a second run to determine the energy absorption of a second consumer 160; otherwise a third consumer 160 can be checked.

In a step 230, the household appliance 105 or its type can be determined if the specific progression corresponds to one of the predetermined progressions. An identification of the household appliance 105 or its type can be allocated to the predetermined progression.

In a step 235, the supply facility 110 can terminate the delimitation of the energy that is provided via the connection 115 from the step 210. It is possible instead to provide energy that is adapted to the requirements of the specific household appliance 105 or its type. In particular, energy can be provided below a second delimitation that is greater than the first delimitation. In this case, a voltage, a current and/or a power of the provided electrical energy can be controlled or delimited to respectively predetermined amounts.

Simultaneously with the step 235, the household appliance 105 can in a step charge the energy storage device 150 by means of energy from the connection 115. The charging process can be terminated if the energy storage device 150 is sufficiently filled and the processing facility 145 or the control apparatus 140 interrupts a flow of energy from the connection 115 to the energy storage device 150. Alternatively, the household appliance 105 can be removed from the supply facility 110, wherein the connection 115 is released.

Figure 3:
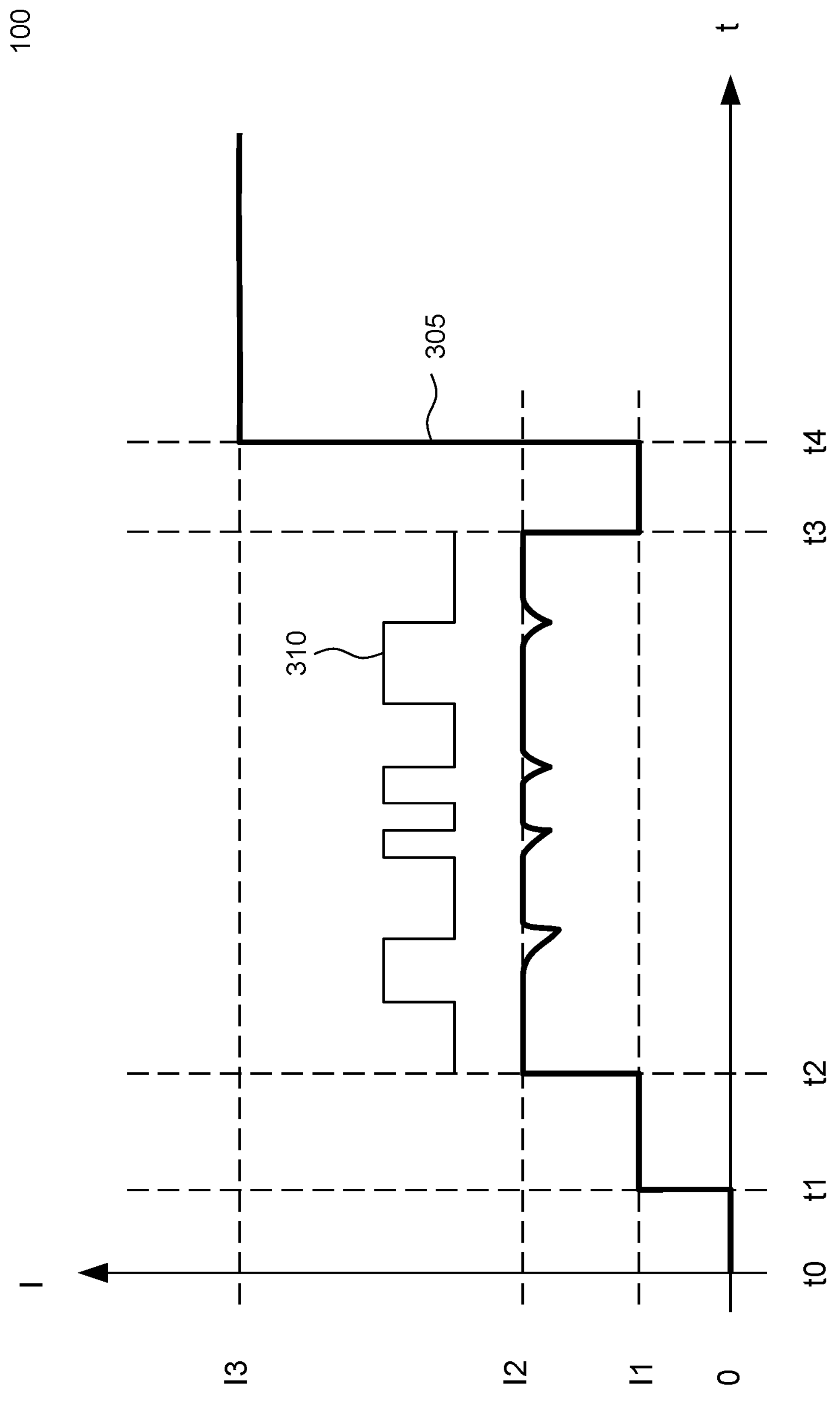
FIG. 3 shows exemplary energy flows.

FIG. 3 shows by way of example energy flows on a system 100. A first progression 305 shows by way of example an electrical current I that is transmitted via the terminal 115. At a point in time t0, the connection 115 is interrupted and the current I amounts to 0. It is to be noted that the delimitation shown of the current I is exemplary and in another embodiment a provided voltage U or a provided electrical power P can also be delimited. In order to control the different characteristics of the provided energy, the voltage is usually respectively influenced in a predetermined manner.

At a point in time t1, the connection 115 between the supply facility 110 and the household appliance 105 is closed and a current I1 flows. This can be particularly small and in particular serve the mutual signaling of the closed connection 115. By way of example, I1 can amount to less than approx. 5 mA.

At a point in time t2, the consumer 160 of the household appliance 105 is operated by means of current from the connection 115 according to a predetermined sequence 310. The sequence 310 is purely exemplary and indicated without reference to the current strength I in the representation of FIG. 3. The current strength is delimited during the sequence 310 to a value I2, which must not be exceeded. In dependence upon the sequence 310, the current I can, however, temporally drop below the value I2.

At a point in time t3, the sequence 310 terminates and the current I can drop to a lower value that can amount in particular to the value I1 or an even smaller value, in particular 0.

At a point in time t4, the energy that is provided by the supply facility 110 via the connection 115 can be increased, in that a current I is permitted that is greater than I2. Optionally, the current is limited to a predetermined value I3. Simultaneously, the processing facility 145 of the household appliance 105 can commence a charging process of the energy storage deice 150 by means of energy via the connection 115.

REFERENCE CHARACTERS

100 System
105 Household appliance
110 Supply facility
115 Connection
120 Power source
125 Processing facility
130 First terminal
135 Second terminal
140 Control apparatus
145 Processing facility
150 Energy storage device
155 Drive facility
160 Electric consumer (fan motor)
165 Suction appliance
200 Method
205 Produce connection
210 Provide energy at a first limitation
215 Operate consumer with energy according to sequence
220 Determine progression energy absorption
225 Compare with predetermined progression
230 Determine household appliance type
235 Provide energy at a second delimitation
240 Charge energy storage device
305 First progression
310 Second progression (sequence)

The invention claimed is:

1. A method for transmitting electrical energy from a supply facility to a household appliance through an electrical connection, the method comprising:

delimiting electrical energy provided through the connection to a first predetermined amount;

operating at least one electrical consumer of the household appliance according to a predetermined sequence with electrical energy from the connection, the predetermined sequence including switching the electrical consumer on or off;

determining a temporal progression of electrical energy transmitted through the connection during the predetermined sequence;

terminating the delimitation to the first predetermined amount when the temporal progression corresponds to a predetermined temporal progression; and electrically evaluating a switch-on or switch-off transient behavior of the electrical consumer for determining the temporal progression.

2. The method according to claim 1, which further comprises delimiting the electrical energy provided through the connection to at least one of a predetermined electrical current or a predetermined electrical voltage.

3. The method according to claim 1, which further comprises operating multiple electrical consumers of the household appliance according to the predetermined sequence.

4. The method according to claim 1, which further comprises delimitating a current strength of the electrical energy provided through the connection to a predetermined value during the delimitation.

5. The method according to claim 1, which further comprises increasing an electrical energy absorption of the consumer in a time delayed manner after switching-on the consumer.

6. The method according to claim 1, which further comprises switching-on the consumer during the predetermined sequence only during a predetermined duration.

7. The method according to claim 1, which further comprises:

recognizing a type of the household appliance based on the temporal progression; and adapting the electrical energy provided through the connection to the type of the household appliance after the termination of the delimitation to the first predetermined amount.

8. The method according to claim 7, which further comprises delimiting the electrical energy provided through the connection to a second predetermined amount during the adaptation of the electrical energy.

9. The method according to claim 1, which further comprises moving the household appliance to the supply facility to produce the connection.

10. The method according to claim 1, which further comprises charging an electrical energy storage device of the household appliance by using electrical energy transmitted through the connection, after terminating the delimitation to the first amount.

11. A supply facility for a household appliance, the supply facility comprising:

a terminal for producing an electrical connection to the household appliance;

a controllable power source for providing electrical energy through said connection; and a processing facility configured:

to delimit the electrical energy provided through said connection to a first predetermined amount, to determine a temporal progression of the electrical energy transmitted through said connection, to terminate the delimitation to the first predetermined amount when the temporal progression corresponds to a predetermined temporal progression, and to electrically evaluate a transient response being a switch-on or switch-off behavior of an electrical consumer, in order to determine the temporal progression.

12. A household appliance for connection to a supply facility, the household appliance comprising:

a terminal for producing an electrical connection to the supply facility;

an electrical energy storage device;

a controllable electric consumer configured to be operated with electrical energy from said connection; and a processing facility configured:

to operate said electrical consumer according to a predetermined sequence with electrical energy from said connection, resulting in electrical energy transmitted through said connection following a temporal progression, the predetermined sequence including switching said electrical consumer on or off, and the temporal progression including a turn-on or turn-off transient behavior of the electrical consumer; and to charge said electrical energy storage device by using the electrical energy from said connection.

13. The household appliance according to claim 12, wherein the household appliance is an autonomously drivable floor treatment machine.

14. A system, comprising:

a supply facility for a household appliance and a household appliance for connection to said supply facility;

said supply facility including:

a terminal of an electrical connection to said household appliance;

a controllable power source for providing electrical energy through said connection; and a processing facility configured:

to delimit the electrical energy provided through said connection to a first predetermined amount, to determine a temporal progression of the electrical energy transmitted through said connection, to terminate the delimitation to the first predetermined amount when the temporal progression corresponds to a predetermined temporal progression, and to electrically evaluate a transient response being a switch-on or switch-off behavior of an electrical consumer, in order to determine the temporal progression; and said household appliance including:

a terminal of said electrical connection to said supply facility;

an electrical energy storage device;

a controllable electric consumer configured to be operated with electrical energy from said connection; and a processing facility configured:

to operate said electrical consumer according to a predetermined sequence with electrical energy from said connection, resulting in electrical energy transmitted through said connection following a temporal progression, the predetermined sequence including switching said electrical consumer on or off, and the temporal progression including a turn-on or turn-off transient behavior of the electrical consumer; and to charge said energy storage device by using the electrical energy from said connection.

* * * * *